United States Patent
Hosoe et al.

(10) Patent No.: US 6,544,667 B1
(45) Date of Patent: Apr. 8, 2003

(54) MAGNETIC RECORDING MEDIUM, PRODUCING METHOD OF THE SAME AND MAGNETIC RECORDING SYSTEM

(75) Inventors: Yuzuru Hosoe, Hino (JP); Yoshibumi Matsuda, Hiratsuka (JP); Yotsuo Yahisa, Odawara (JP); Kiwamu Tanahashi, Kokubunji (JP); Hiroyuki Suzuki, Fujisawa (JP); Koji Sakamoto, Odawara (JP); Akira Kato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/523,381

(22) Filed: Mar. 10, 2000

(30) Foreign Application Priority Data

Mar. 11, 1999 (JP) ............................................ 11-064631

(51) Int. Cl.[7] .................................................. G11B 5/65
(52) U.S. Cl. ...................... 428/664; 428/332; 428/336; 428/611; 428/665; 428/667; 428/670; 428/694 TS
(58) Field of Search ................. 428/611, 670, 428/664–668, 694 TS, 332, 336, 900

(56) References Cited

U.S. PATENT DOCUMENTS

| | | | |
|---|---|---|---|
| 4,652,499 A | | 3/1987 | Howard |
| 4,833,020 A | * | 5/1989 | Shiroishi et al. ............. 428/336 |
| 5,523,173 A | * | 6/1996 | Doerner et al. ............. 428/611 |
| 5,789,056 A | * | 8/1998 | Bian et al. .................. 428/336 |
| 5,851,628 A | * | 12/1998 | Ohkubo et al. ............. 428/141 |
| 5,900,324 A | * | 5/1999 | Moroishi et al. ............ 428/611 |
| 6,071,607 A | * | 6/2000 | Okuyama et al. ........... 428/332 |
| 6,143,388 A | * | 11/2000 | Bian et al. .................. 360/128 |
| 6,150,015 A | * | 11/2000 | Bertero et al. .............. 428/332 |
| 6,303,217 B1 | * | 10/2001 | Malhotra et al. ........... 428/332 |

FOREIGN PATENT DOCUMENTS

| | | |
|---|---|---|
| JP | 63-187416 | 8/1988 |
| JP | 63-197018 | 8/1988 |
| JP | 7-073427 | 3/1995 |
| JP | 8-030954 | 2/1996 |
| JP | 9-265619 | 10/1997 |
| JP | 10-074314 | 3/1998 |
| JP | 10-143865 | 5/1998 |
| JP | 10-214412 | 8/1998 |

OTHER PUBLICATIONS

JPO Abstract Translation of JP 10–233016 A (Image No. JP410233016A).*
Journal of Applied Physics, vol. 79, No. 8, Apr. 15, 1996, "Reduction ofl Co–Cr–PT media noise by addition of Ti o Cr Underlayer", Y. Matsuda et al, pp. 5351–5353.

\* cited by examiner

Primary Examiner—Paul Thibodeau
Assistant Examiner—Kevin M. Bernatz
(74) Attorney, Agent, or Firm—Mattingly, Stanger & Malur, P.C.

(57) ABSTRACT

In a magnetic recording medium having Co-based alloy magnetic layer containing Pt formed on a substrate through an underlayer, by forming said underlayer with plural underlayers including double layer structure which is formed by piling up 1st underlayer of Cr-based alloy containing Ti and 2nd underlayer of Cr-based alloy containing at least one element selected from a group comprising Mo and W in this sequence, crystal grain diameter is decreased and then medium noise can be decreased, and c axis is oriented to in-plane direction and then high coercivity can be obtained, consequently the magnetic recording medium having high signal to noise ratio at high recording density region is obtained. Further a small size large capacity magnetic recording system can be provided by combination of said magnetic recording media with a MR (magnetoresistive) head.

17 Claims, 4 Drawing Sheets

MAGNETIC RECORDING MEDIUM, PRODUCING METHOD OF THE SAME AND MAGNETIC RECORDING SYSTEM

BACKGROUND OF THE INVENTION

The present invention is related to a magnetic recording medium on which large capacity information can be recorded, a producing method of the medium, and a magnetic recording system. Especially, the present invention is related to a magnetic recording medium which is suitable for high density magnetic recording, and producing method of the medium, and a large capacity magnetic recording system using this magnetic recording medium.

Today, it is strongly required to increase storage capacity of a magnetic recording system. To reproduce signals from fine recorded bits, in relation to a magnetic head, a composite type head is being employed rapidly in which a magnetoresistive head (MR) having higher efficiency than a conventional inductive head is used as a reproducing element. Further, to obtain higher efficiency, a head which utilizes very large magnetoresistive effect (giant magnetoresistive effect or spin valve effect) produced in a multi-layered magnetic layer in which plural magnetic layers are piled up with insertion of a non-magnetic layer between the magnetic layers, is being used actually. On the other hand, to obtain a magnetic recording medium on which high density magnetic recording is possible, it is required that out put voltage at high linear recording density region is increased and that medium noise is decreased simultaneously. Especially, being accompanied by employing of a high efficiency magnetic head, it is strongly required for a magnetic recording medium to decrease its medium noise.

As a magnetic recording medium, a in-plane magnetic recording medium is used which comprises a Co-based alloy magnetic layer as follows: CoNiCr, CoCrTa, CoCrPt, CoCrPtTa, CoCrPtB, CoCrPtTaB, etc. Especially, a Co-based alloy magnetic layer containing Pt has high coercivity and high output voltage at high linear recording density region, therefore, it is suitable for high density magnetic recording. These Co-based alloy have hexagonal closed packed structure (h c p structure) of which c axis is easy magnetization axis, and, to use as a in-plane magnetic recording medium, it is desired that the c axis is oriented to in-plane direction. Therefore, it is a generally used method that an underlayer having body-centered cubic structure (b c c structure) is formed on a substrate first, then a Co-based alloy magnetic layer is grown with epitaxial growth mode on the underlayer, and the c axis is oriented to in-plane direction as a result.

As the underlayer, Cr is used generally, but, when a magnetic layer contains large atoms such as Pt, etc., methods to orient c axis of a magnetic layer along parallel direction to the film surface, are disclosed, in which lattice matching between a magnetic layer and an underlayer is improved by using Cr alloy underlayer of which lattice space is increased with addition of Ti to Cr (disclosed in Japanese patent publication number 63-197018) or with addition of V to Cr (disclosed in U.S. Pat. No. 4,652,499).

About materials of the underlayer besides the above mentioned materials, it is disclosed in Japanese patent publication number 63-187416 that extensive materials including Mo, W, Hf, etc. can be used. Especially, a Cr-based alloy to which Ti is added, as described in Journal of Applied Physics (J. Appl. Phys.), vol. 79, pp5351–5353, has fine crystal grains and accordingly has low medium noise, therefore it is a suitable underlayer material for high density magnetic recording. Further, it is disclosed in Japanese patent publication number 63-187416 that signal to noise ratio and reproduced signal modulation can be improved by forming an underlayer consisting of double layers. An example of the underlayer having double layers structure is disclosed in Japanese patent publication number 7-73427 and 8-30954, in which $2^{nd}$ underlayer consisting of a Cr-based alloy with additive elements Mo, Zr, Ta, V, Nb, Ti, is formed on $1^{st}$ underlayer comprising Cr. Further, as disclosed in Japanese patent publication number 10-74314, medium noise is decreased by providing a Co-based non-magnetic alloy layer under the above-mentioned underlayer. As disclosed in Japanese patent publication number 10-143865, medium noise is decreased even more and in a stable manner because Cr or Zr having high oxidation tendency is contained in this Co-based non-magnetic alloy layer and its surface is oxidized a little by exposing the surface in oxygen atmosphere. A magnetic recording medium in which a Cr-based underlayer having b c c structure is formed on Cr-based composite film (seed layer) containing Zr, Ti, etc., is disclosed in Japanese patent publication number 9-265619 and 10-214412.

According to the above mentioned conventional technologies, as a magnetic recording medium to be suitable for high density magnetic recording, a magnetic recording medium which comprises a Co-based alloy magnetic layer containing Pt to obtain high coercivity easily in combination with a CrTi alloy underlayer to be able to have small crystal grains, is considered. But, the magnetic recording medium having such structure has technological problems that in-plane orientation of c axis in the magnetic layer is loose and that squareness of magnetization curve or coercivity squareness is easy to decrease. If coercivity squareness s* becomes excessively small, output voltage at high linear recording density is decreased. Especially, this tendency is remarkable in the case of magnetic layers comprising CoCrPtTa alloy, CoCrPtB alloy, or CoCrPtTaB alloy to which a lot of Pt and Ta, or Pt and B are added to obtain high crystal magnetic anisotropy field required to have high coercivity.

SUMMARY OF THE INVENTION

It is 1st object of the present invention to solve the above mentioned problems and to provide a magnetic recording medium having high signal to noise ratio at high recording density region.

It is 2nd object of the present invention to provide a producing method which produces with high repeatability a magnetic recording medium having high signal to noise ratio at high recording density region.

It is 3rd object of the present invention to provide a small size large capacity magnetic recording system having high recording density over 5 Gbits per square inch (5 Gbits/in$^2$).

To solve the above mentioned problems, the inventors of the present invention examined a lot of magnetic recording media with various structures and it was found that, by forming 2nd Cr-based alloy underlayer containing at least one element selected from a group comprising Mo and W between a magnetic layer and a Cr-based alloy underlayer containing Ti, the c axes of the magnetic layer were oriented along parallel direction to the film surface and the crystal grain diameters were decreased, namely superior results were obtained.

As a results of analyzing by X-ray diffraction a crystalline structure of a magnetic layer with addition of Pt and Ta, or Pt and B which was formed directly on a CrTi underlayer, it was confirmed that the underlayer had b c c structure and its {001}surface was oriented along parallel direction to the film surface. And, it was also confirmed that the magnetic layer formed on the underlayer had h c p structure and c axes of the magnetic layer was oriented along vertical direction to the film surface. Generally, It is well known that a magnetic layer having h c p structure with (11.0) orientation grows generally in epitaxial mode on a underlayer having b c c structure with (001) orientation as above mentioned. The above mentioned orientation is differ from this, and it is considered that the epitaxial growth is prevented by some reasons. In the case of using CrMo or CrW underlayer instead of the CrTi underlayer, it was confirmed that a magnetic layer having h c p structure with (11.0) orientation grew in epitaxial mode on a underlayer with (001) orientation, therefore, it is supposed that adding Ti caused chemical or structural variation on the surface of the underlayer, and this affected the epitaxial growth.

In the case of using CrMo or CrW underlayer, the crystal grain diameter is larger than that of the CrTi underlayer and it is difficult to maintain sufficient low noise characteristics. Against this, when CrMo or CrW layer as a 2nd underlayer was inserted between the CrTi underlayer and the magnetic layer, the 2nd underlayer with (001) orientation grew in epitaxial mode on the CrTi layer with (001) orientation, (11.0) orientation of a magnetic layer with additives of Pt and Ta, or Pt and B was achieved on this 2nd underlayer, and then in-plane orientation of the c axis could be obtained.

On the other hand the crystal grain diameter became smaller than that in the case of using CrMo or CrW single underlayer because it was determined by small crystal grain size of CrTi underlayer formed first.

As described above, in a magnetic recording medium having Co-based alloy magnetic layer containing Pt formed on a substrate through a underlayer, by forming said underlayer with plural underlayers including double layer structure which is formed by piling up 1st underlayer of Cr-based alloy containing Ti and 2nd underlayer of Cr-based alloy containing at least one element selected from a group comprising Mo and W, in this sequence, crystal grain diameters can be decreased, c axes can be oriented to in-plane direction, and then said 1st object is achieved.

It is desirable that the Ti content in said 1st underlayer is 5 at. % or more and 35 at. % or less. When the Ti content is less than 5 at. %, the effect to make crystal grain small is decreased, and when the Ti content is more than 35 at. %, the lattice matching between the underlayer and the Co-based alloy magnetic layer containing Pt which is suitable for high density magnetic recording, becomes poor and the crystalline property of magnetic layer is deteriorated. It is suitable that a film thickness of the 1st underlayer is 5 nm or more and 40 nm or less. When the thickness is less than 5 nm, it becomes difficult to control the crystalline property and crystal orientation of the layer to be formed on it, and when the thickness is more than 40 nm, efficiency of mass production is decreased, simultaneously the crystal grain diameter becomes large, the medium noise is increased, and then such thicker layer is unsuitable.

It is desirable that the sum of the Mo content and the W content in said 2nd underlayer is 5 at. % or more and 80 at. % or less. When the content is less than 5 at. % or more than 80 at. %, the lattice matching with the Co-based alloy magnetic layer containing Pt which is suitable for high density magnetic recording becomes poor and sufficient high coercivity is not obtained. The 2nd underlayer comprises an alloy consisting of Cr and at least one element selected from a group comprising Mo and W, but other elements may be added if necessary within the limited amount. It is desirable that the sum of the content of the other elements is about 2 at. % or less. But, it is desirable that Ti is not contained in the 2nd underlayer Even when Ti is contained in the 2nd underlayer, it is desirable that the Ti content is 1 at. % or less. In higher content than this, when the Co alloy magnetic layer contains both Pt and Ta, or both Pt and B, the c axis of the magnetic layer is easy to be oriented along vertical direction to the film surface and such medium is unsuitable for a in-plane magnetic recording.

It is suitable that a thickness of the 2nd underlayer is 1 nm or more and 40 nm or less. When the thickness is less than 1 nm, the effect by which the c axis of the Co based magnetic layer containing Pt formed on the underlayer is oriented along in-plane direction, is almost lost, and when the thickness is more than 40 nm, an efficiency of mass production is decreased, and the crystal grain diameter becomes large, then the medium noise is increased, and then such thicker layer is unsuitable also. It is more suitable that the thickness of the 2nd underlayer is 1 nm or more and 20 nm or less, because higher signal to noise ratio can be obtained in the case.

As the Co based alloy magnetic layer containing Pt, following alloys are used: CoCrPt, CoCrPtTa, CoCrPtTi, CoCrPtNb, CoCrPtB, CoCrPtTaB, etc.

By adding Pt to the Co based alloy magnetic layer, it is possible to obtain a high coercivity required for a high density magnetic recording. It is desirable that the Pt content is 3 at. % or more and 25 at. % or less. When the Pt content is less than 3 at. %, the effect to increase the coercivity is small. Inversely when the Pt content is more than 25 at. % being too high, the coercivity is also decreased. It is more suitable that the Pt content is 6 at. % or more and 20 at. % or less.

It is suitable that the Pt content is kept in above range and the sum of the Mo content and the W content in said 2nd underlayer is 5 at. % or more and 80 at. % or less, because it is easy to obtain the coercivity of 200 kA/m (2.5 kOe) and it is able to form bits (magnetization transitions) of high linear recording density over 300 kFCI. Cr in these magnetic layers is segregated around a boundary of the crystal grain, accordingly this matter decreases exchange interaction between the magnetic crystal grains and decreases the medium noise. It is desirable that the Cr content is 18 at. % or more to obtain sufficient low medium noise. But, when the Cr content is more than 25 at. % excessively, saturated magnetization becomes small excessively and the coercivity is decreased, then such higher content is unsuitable. By adding also Ta with adding Pt to the magnetic layer, the higher coercivity is obtained. It is desirable that the Ta content is 1 at. % or more and 5 at. % or less. When the Ta content is lass than 1 at. %, the both effects to increase the coercivity and to promote the segregation of Cr are small, and when the Ta content is more than 5 at. %, the crystal property is deteriorated. It is suitable that the sum of the Co content and the Pt content in whole composition elements of the magnetic layer is 80 at. % or less and the coercivity measured by a vibrating sample magnetometer under a magnetic field given to in-plane direction is 200 kA/m or more, because a read/write characteristics in a high recording density region is superior. But when the coercivity is over 320 kA/m being too high, a over write characteristics is deteriorated, therefore it is suitable that the coercivity of the magnetic recording medium has controllable magnitude in a range in which the over write is possible. Furthermore, to improve wear durability, it is suitable that a C based protective layer is formed on the magnetic layer and a lubricant layer is still formed on it.

In the magnetic recording medium of the present invention, a seed layer which comprises Co based or Ni based alloys such as NiP, CoCrZr, NiCrZr, etc. consisting of substantially amorphous or fine crystalline metal film, can be formed between the substrate and the underlayer. By forming the seed layer, the medium noise can be decreased still more. This effect to decrease the medium noise by the seed layer, is especially remarkable when glass ceramics or glass with reinforced surface is used as the substrate. By using Co or Ni as main component of the seed layer, high adhesion strength to the substrate is also obtained. Further, by adding Cr as an additive element, ferromagnetic component of Co or Ni contained in the seed layer is decreased effectively, magnetization of the seed layer can be made negligible small from the view point of the reproducing head, and simultaneously high corrosion resistance is obtained. Further, by adding Zr, the seed layer can be made amorphous without deterioration of the corrosion resistance.

By means of that the surface of the seed layer CoCrZr, NiCrZr, etc. is exposed in oxygen atmosphere and oxidized a little, the crystal grain of the Cr alloy underlayer formed on it can be made small and crystal orientation of the Cr alloy can be made into (100) orientation by which the c axis of the Co alloy can be oriented along parallel direction to the film surface. Accordingly, the medium noise can be decreased stably. This effect is remarkable when CrTi is used as Cr alloy underlayer formed on the seed layer. Here, "fine crystal" means that a crystal grain diameter is 8 nm or less, and "substantially amorphous" is defined as a structure of which diffraction pattern is observed as halo when its selected area electron diffraction image is photographed by a transmission electron microscopy. Such fine structure of the layers which constitute a magnetic recording medium, can be evaluated by a transmission electron microscopy with high magnification, or by a pattern of diffraction ring on a selected area electron diffraction image, using specimens which are-prepared in a such way that the recording medium is sliced thin in vertical direction to the substrate surface or the substrate is made thin by a mechanical polishing, and next the thin specimen is made further thinner by a ion-milling method which mills the specimen upward and downward.

The said 2nd object is achieved by employing a producing method of the above-mentioned magnetic recording medium characterized by the processes including a process to prepare a substrate, a process to heat the substrate previous to forming a 1st underlayer on the substrate, a process to form a 1st underlayer, a 2nd underlayer, and a magnetic layer in this sequence in a vacuum chamber by sequential sputtering method after heating the substrate. By heating the substrate previous to forming the 1st underlayer, impurity gas absorbed on a under surface of the 1st underlayer is eliminated and the 1st underlayer having stable crystal orientation can be formed. By forming the 2nd underlayer and the magnetic layer on this 1st underlayer sequentially without exposing in the atmosphere during the processes, stable epitaxial growth of each layer can be attained. Further, by setting the heating temperature in a suitable range, non-magnetic elements as Cr, etc. can be separated at boundary of the magnetic crystal grains, and then the medium noise can be decreased.

The said 3rd object is attained by providing a magnetic recording system comprising a magnetic recording medium, a driving mechanism which drives said magnetic recording medium, a magnetic head which comprises a recording part and a reproducing part, a head driving mechanism which drives said magnetic head relatively on said magnetic recording medium, and a read and write signal processing means which sends recording signal to said head and processes reproduced signal from said head, in which the reproducing part of said magnetic head is constituted with a magnetoresistive head, and said magnetic recording medium is constituted with the above-mentioned magnetic recording medium of the present invention. Hereby, a small size large capacity magnetic recording system having high recording density and high reliability can be provided.

In relation to the said magnetoresistive head, it is desirable that its magnetoresistive sensor is formed between two shield layers which comprise soft magnetic material and are 0.07 $\mu$m or more and 0.2 $\mu$m or less apart each other. If the distance between two shield layers is larger than 0.2 $\mu$m, sufficient reproduced signal can not be obtained at high linear recording density region over 220 kFCI. If the distance between two shield layers is smaller than 0.07 $\mu$m, it comes to be difficult to keep insulation between the shield layer and the magnetoresistive sensor. It is desirable that the product of thickness t of the magnetic layer of said magnetic recording medium by residual magnetic flux density Br measured under a magnetic field given along the running direction of head relatively to the magnetic recording medium at recording; Br×t is 3 mA (38 gauss·$\mu$m) or more and 7.5 mA (94 gauss·$\mu$m) or less. When Br×t is smaller than 3 mA, risk of read error is increased, because the reproduced signal is decreased by that recorded bits are left for long time after recording, and when Br×t is larger than 7.5 mA (94 gauss·$\mu$m), over write at recording is difficult. In the above-mentioned magnetic recording system, as the reproducing part of the magnetic head, it is suitable to employ a magnetoresistive sensor which includes plural conductive magnetic layers in which large resistance variation is occurred by changing respective magnetization direction relatively with external magnetic field, and conductive non-magnetic layers formed between said conductive magnetic layers. By using this head, data signal recorded at high recording density over 300 kFCI can be reproduced stably, and then high recording density over 5 Gbits per square inch can be attained.

DESCRIPTION OF THE PREFERRED EMBODIMENTS

Embodiments are disclosed referring Figures.

Embodiment 1

Figure 1:
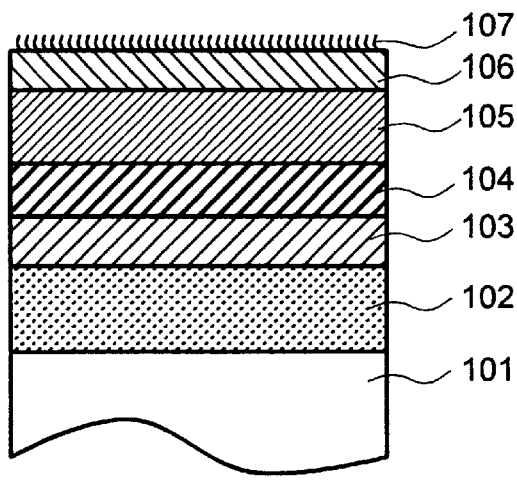
FIG. 1 is a cross sectional view of a magnetic recording medium of an embodiment of the present invention or a magnetic recording medium obtained by its producing method.

FIG. 1 is a cross sectional view of a magnetic recording medium of an embodiment of the present invention or a magnetic recording medium obtained by its producing method. The magnetic recording medium of this embodiment of the present invention is used as an in-plane magnetic recording medium for an example. As a substrate 101, a soda-lime glass substrate having chemical reinforced surface was used, which was 2.5 inch type substrate with thickness of 0.635 mm. After this substrate 101 was washed, multi-layered film described below was formed by a single substrate processing type sputtering system (MDP250B) made by INTEVAC company with processing time of 9 seconds.

Figure 2:
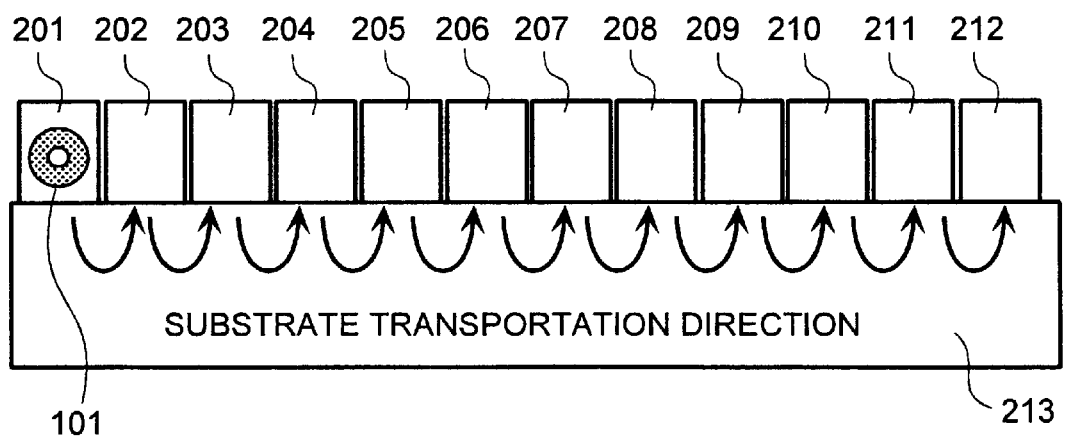
FIG. 2 is a schematic diagram showing a chamber organization or a station organization of a sputtering system used in a producing method of a magnetic recording medium of an embodiment of the present invention.

A chamber organization or a station organization of this sputtering system is shown in FIG. 2. Namely, the sputtering system in the embodiment has a structure in which a main vacuum chamber 213, a preparation chamber 201, 1st thin film sputtering chamber 202, 2nd thin film sputtering chamber 203, a heating chamber 204, a oxidization chamber 205, 3rd thin film sputtering chamber 206, 4th thin film sputtering chamber 207, 5th thin film sputtering chamber 208, 6th thin film sputtering chamber 209, 7h thin film sputtering chamber 210, 8th thin film sputtering chamber 211, and a taking out chamber 212 are connected. A substrate 101 is transported through each chambers from the preparation chamber 201 to the taking out chamber 212 via the main vacuum chamber 213, and during this transportation, the following sequence of the producing process is executed.

Namely, a substrate 101 was loaded in the preparation chamber 201, then a seed layer 102 which is comprised of a Co-30 at. % Cr-10 at. % Zr alloy was formed on the substrate 101 in the 1st thin film sputtering chamber 202 and the 2nd thin film sputtering chamber 203 in which 18 nm thickness in each chamber and the sum 36 nm thickness was formed. After that, the substrate 101 having the seed layer on it was heated to 250° C. by a lamp heater in the heating chamber 204, and next, it was exposed in an atmosphere of mixed gas 99%Ar-1%O2 at a pressure of 0.9 Pa (7 mTorr) and with flow of 21 sccm for 3.5 seconds in the oxidization chamber 205, then the 1st underlayer 103 comprising Cr-20 at. %Ti alloy with thickness of 15 nm, was formed in the 3rd thin film sputtering chamber 206, then the 2nd underlayer 104 comprising Cr-30 at. %Mo alloy with thickness of 15 nm, was formed on it in the 4th thin film sputtering chamber 207. Further a magnetic layer 105 comprising Co-20 at. % Cr-8 at. %Pt-3 at. %Ta alloy film with thickness of 21 nm, was formed in the 5th thin film sputtering chamber 208, next, a protective layer 106 was formed on it in the 6th thin film sputtering chamber 209, the 7h thin film sputtering chamber 210, and the 8th thin film sputtering chamber 211, in which 3 nm thickness in each chamber and the sum 9 nm thickness was formed. After, the substrate 101 was taken out from the sputtering system through the taking out chamber 212, a lubricant having main ingredient of perfluoroalkyl-polyether was coated on the protective layer and a lubricant layer with thickness of 1.5 nm was formed.

In all sputtering process for the said seed layer 102, the 1st underlayer 103, the 2nd underlayer 104, and the magnetic layer 105, Ar at a pressure of 0.9 Pa (7 mTorr) is used as a discharge gas.

Although the structure of layers formed on the one side surface of the substrate 101 is shown in FIG. 1, but, in this embodiment, the medium is formed on both sides of the substrate, the same layers shown in FIG. 1 are also formed on the other side of the substrate in same sequence, and a magnetic recording medium 301 of which both sides work as magnetic recording surfaces is built in a magnetic recording system described later.

A magnetic characteristics of the magnetic recording medium 301 obtained by above processes was measured by a vibrating sample magnetometer, and as a result, it was obtained that coercivity was 208 kA/m (2.61 kOe), coercivity squareness is 0.72, and product of the thickness t of the magnetic layer by residual magnetic flux density Br; Br×t is 6.7 mA (84 gauss·μm). This magnetic recording medium 301 was cut to specimens, a part of thin film layers of it was milled and thinned into conical shape toward vertical direction to the surface by a ion-milling method, then a fine structure of the seed layer 102 was observed by a transmission electron microscopy at acceleration voltage of 200 kV, and, as a result, it was found that the crystal grain diameter is smaller than 8 nm. Further, a halo was observed in its selected area electron diffraction image photograph, and it was verified that the seed layer was substantially amorphous. A crystal lattice structure of the cross section was analyzed by a transmission electron microscopy and it was verified that the 2nd underlayer 104 grew on the 1st underlayer 103 in epitaxial mode. It was verified by x-ray diffraction method that these two underlayers both had b c c structure, and that their {100} surface were oriented along nearly parallel direction to the substrate surface.

A ratio of amplitude (0-p value) SLF of isolated reproduced signals to integrated medium noise Nd measured when signals of 300 kFCI were recorded namely SLF/Nd was evaluated, and high ratio of 28.3 dB was obtained. Here, a magnetic head comprising a spin valve type reproducing head described in embodiment 3 of which shield gap length Gs was 0.18 μm and an inductive recording head of which gap length was 0.25 μm, was used and head flying height was 27 nm.

For above-mentioned substrate 101, in addition to chemical reinforced almino-silicate, such rigid substrates can be used as soda-lime glass, silicon, ceramics such as boric silicic acid glass, etc., glass glazed ceramics, Al—Mg alloy with electroless Ni—P deposition, glass with electroless Ni—P deposition, etc . . . .

Embodiment 2

The magnetic recording medium in which the 2nd underlayer 104 of Cr-30 at. %Mo alloy in embodiment 1 was replaced by Cr-30 at. %W alloy, was prepared (medium #2). For comparison, following four kinds of magnetic recording medium were prepared, namely a magnetic recording medium (#3) in which the 2nd underlayer 104 was replaced by Cr, a magnetic recording medium (#4) in which the 2nd underlayer 104 was replaced by Cr-30 at. %V alloy, a magnetic recording medium (#5) in which the 2nd underlayer 104 was not formed, and a magnetic recording medium (#6) in which the 1st underlayer 103 of CrTi alloy in embodiment 1 was replaced by Cr-30 at. %Mo alloy and the 2nd underlayer 104 was not formed.

Magnetic recording media prepared were evaluated by electron beam diffraction method and x-ray diffraction method with a transmission electron microscope, and it was verified that the 1st underlayer 103 and the 2nd underlayer 104 both have b c c structure and their {100} surface were oriented along nearly parallel direction to the substrate surface.

Table 1 shows the characteristics of the magnetic recording media made in this embodiment as coercivity, average crystal grain diameter evaluated with a transmission electron microscope, and SLF/Nd evaluated by similar way as in the embodiment 1. This Table also shows the characteristics of the magnetic recording medium (#1) made in the embodiment 1. As shown in this Table, relatively high coercivity of over 200 kA/m is obtained in the magnetic recording media (#1,#2) in which CrTi alloy is used as the 1st underlayer 103 and CrMo or CrW is used as the 2nd underlayer 104. This is based on that c axis of the magnetic layer 105 is parallel to the film surface. The magnetic layers in these media have relatively small average crystal grain diameter of about 13 nm, accordingly the medium noise is decreased and high SLF/Nd ratio of over 28 dB is obtained.

In comparison with this, the medium (#5) in which only CrTi layer is formed as the underlayer, has lower coercivity of 82 kA/m and lower SLF/Nd ratio of 22 dB. This is based on that c axis of the magnetic layer is vertical to the film surface. The medium (#6) in which only CrMo layer is formed as the underlayer, has higher coercivity than that of the medium in which only CrTi single layer is formed as the underlayer, but its magnetic layer has very large crystal grain diameter more than 20 nm and SLF/Nd is 5 dB lower than that of the media in which CrMo, CrW, or CrTa is used as the 2nd underlayer, therefore it is difficult to achieve high recording density of over 5 Gbits/in$^2$. The medium (#3) in which the 1st underlayer 103 is CrTi and 2nd underlayer 104 is Cr, has higher coercivity than that of the medium with CrTi single underlayer, but is 60 kA/m lower than that of the media in which CrMo or CrW is used as the 2nd underlayer, and has low SLF/Nd ratio of about 26 dB. The low coercivity of this medium is based on that, because of small lattice constant of Cr, lattice matching to the magnetic layer containing a lot of Pt and Ta is poor, accordingly, the c axis of the magnetic layer has fairly strong tendency to turn to vertical direction to the film surface. The medium (#4) of which the 1st underlayer 103 is CrTi and 2nd underlayer 104 is CrV, has a coercivity higher than that of the medium with CrTi single underlayer but is lower than that of the media in which CrMo or CrW is used as the 2nd underlayer, and has low SLF/Nd ratio of about 27 dB.

Embodiment 3

Figure 3:
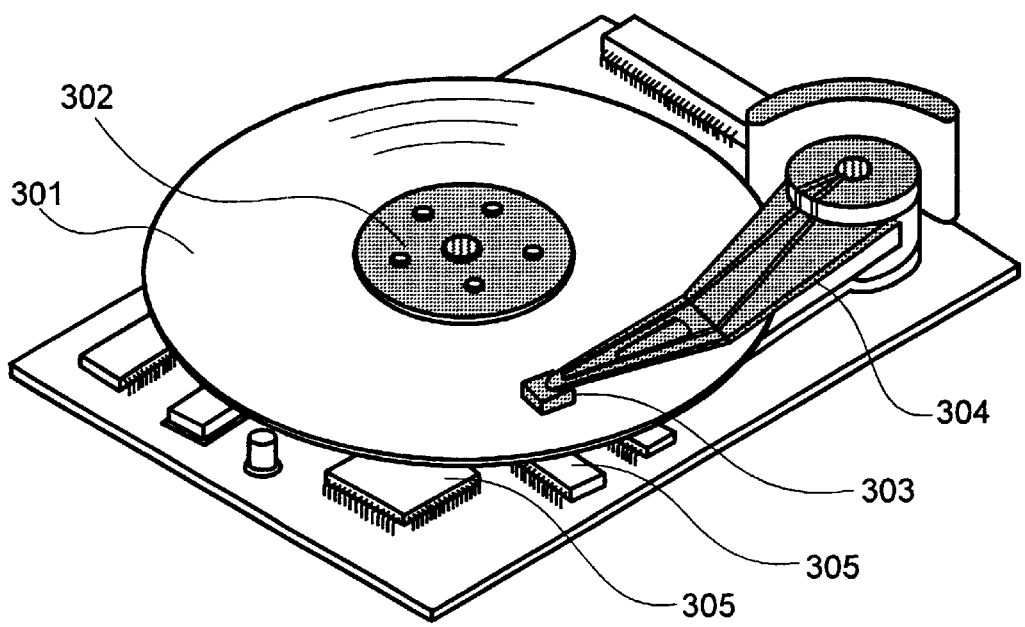
FIG. 3 is a oblique view showing a structure of a magnetic recording system as an embodiment of the present invention.

A magnetic recording system comprising of the magnetic recording medium 301 described in embodiment 1, a driving mechanism 302 having a spindle motor, etc. which rotates said magnetic recording medium 301, a magnetic head 303 which comprises a recording part and a reproducing part, an actuator 304 having a voice coil motor 304a and a head supporting arm 304b which supports the magnetic head 303 and moves relatively said magnetic head 303 to radius direction on said magnetic recording medium 301, and a read and write signal processing means 305 which send recording signal to said magnetic head 303 and processes reproduced signal from said magnetic head 303, was constituted as shown in FIG. 3.

Figure 4:
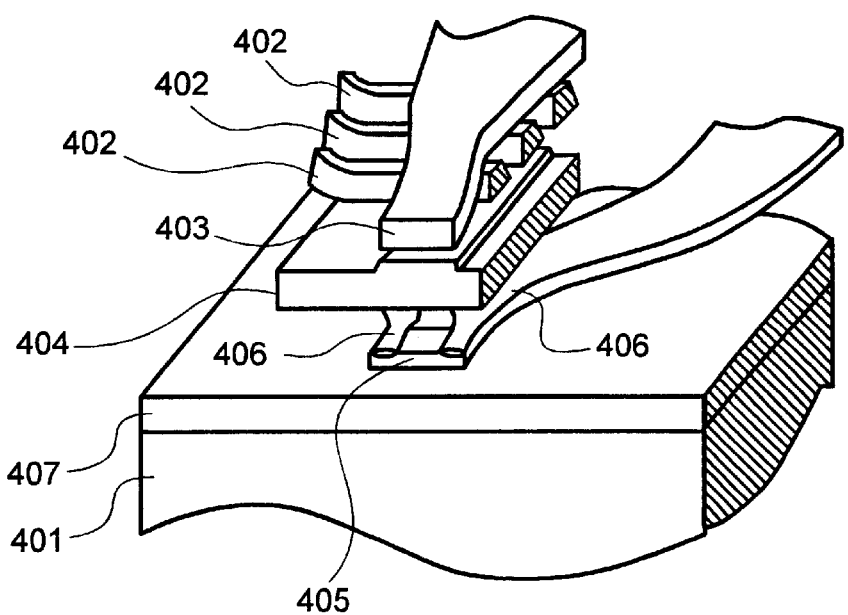
FIG. 4 is a oblique view showing a structure of a magnetic head employed in a magnetic recording system of an embodiment of the present invention.

The reproducing part of said magnetic head 303 was made to comprise of a magnetoresistive head. FIG. 4 is a schematic oblique view showing the structure of the magnetic head. This magnetic head 303 is a composite type head formed on the substrate 401 which comprises a inductive head for recording in combination with a magnetoresistive head for reproducing. Said inductive recording head comprised an upper recording magnetic pole 403 and a lower recording magnetic pole shared upper shield layer 404, and a coil 402 which was placed between the upper and lower magnetic pole, and gap length between the upper and lower recording magnetic poles was 0.25 μm. Cu with thickness of 3 μm was used for the coil 402. Said magnetoresistive reproducing head comprised a magnetoresistive sensor 405 and electrode patterns 406 at both end of the magnetoresistive sensor, the magnetoresistive sensor 405 was placed between the lower recording magnetic pole shared upper shield layer 404 and a lower shield layer 407, and length between the upper and lower shield layer was 0.18 μm. But, a gap layer between the recording magnetic poles and a gap layer between the shield layer and the magnetoresistive sensor, are not shown in this FIG. 4.

Figure 5:
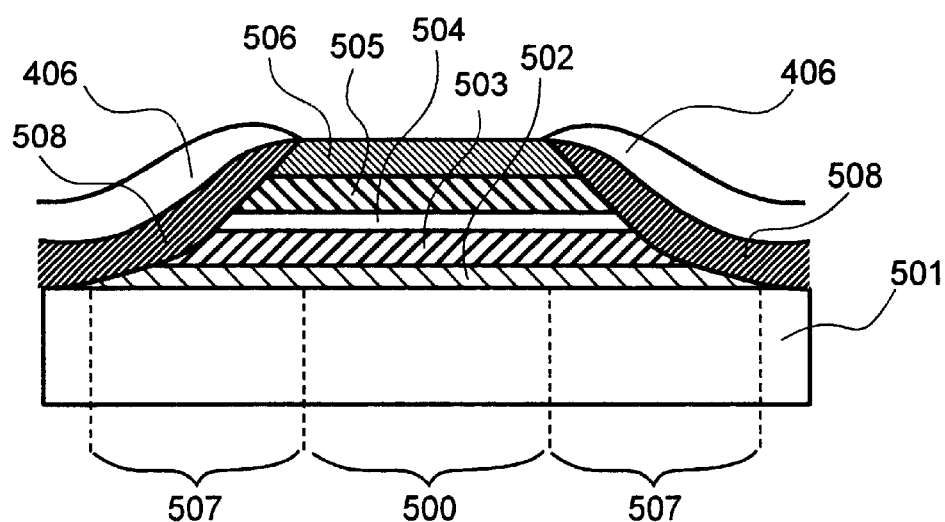
FIG. 5 is a schematic diagram showing a cross sectional structure of magnetoresistive sensor in a magnetic head employed in a magnetic recording system of an embodiment of the present invention.

A cross sectional structure of the magnetoresistive sensor is shown in FIG. 5. A signal detecting area 500 of the magnetoresistive sensor 405 comprises a plural conductive magnetic layers in which large resistance variation is occurred when mutual magnetization direction changes relatively by external magnetic field, and magnetoresistive sensor part (spin value type reproducing sensor) including conductive non-magnetic layers which are placed between these conductive magnetic layers. This magnetoresistive sensor part has the structure which is formed on the gap layer 501 in sequential of a Ta buffer layer 502, 1st magnetic layer 503, a intermediate layer 504 made up of Cu, 2nd magnetic layer 505, and an anti-ferromagnetic layer 506 made up of Fe-50 at. %Mn alloy. Ni-20 at. %Fe alloy was used for said 1st magnetic layer 503 and Co was used for said 2nd magnetic layer 505. Magnetization of the 2nd magnetic layer 505 is fixed to one direction by exchange field from the anti-ferromagnetic layer 506. In contrast, magnetization direction of the 1st magnetic layer 503 which contacts the 2nd magnetic layer 505 through the intermediate layer 504, is varied by leakage field from the magnetic recording medium 301, and resistance variation is occurred.

A tapered parts formed into tapered shape are placed at both end of the signal detecting area 500. This tapered parts 507 comprises permanent magnet layers 508 to make the 1st magnetic layer into a single magnetic domain, and a pair of electrode patterns 406 to take out signals formed on the magnet layer 508. It is required for the permanent magnet layer 508 to have large coercivity and to have a almost fixed magnetization direction hardly varied, and Co—Cr—Pt alloy was used for the permanent magnet layer 508.

A magnetic recording system was constituted of the magnetic recording medium 301 of the present invention (#1 and #2 medium in Table 1) described in the embodiment 1 and 2, in combination with the above-mentioned magnetic head 303. When either medium of the above-mentioned #1 or #2 medium was used, high recording density of over 5 Gbits/in$^2$ was achieved by using the magnetic recording system constituted as described above.

In this embodiment, the magnetic head 303 having the magnetoresistive head formed on a magnetic head slider of which flying rail area was 1.4 mm$^2$ or less and mass was 2 mg or less, was used. The clash durability is improved by that the flying rail area is 1.4 mm$^2$ or less and mass is 2 mg or less. Hereby, high recording density was consistent with high clash durability, and both high recording density of over 5 Gbits/in$^2$ and large Mean Time Before Failure (MTBF) of 3·10$^5$ hours were achieved.

Embodiment 4

The magnetic recording media in which the magnetic layer of Co-20 at. %Cr-8 at. %Pt-3 at. %Ta alloy with thickness of 21 nm in embodiment 1 was replaced by Co-22 at. %Cr-12 at. %Pt-4 at. %B alloy magnetic layer with thickness of 18 nm, the thickness of the 1st underlayer was changed to 25 nm, the thickness of the 2nd underlayer was changed to 5 nm, and the alloy composition of the 2nd underlayer was changed to Cr-20 at. %Mo (#7) or changed to Cr-20 at. %W (#8), were prepared. For comparison the media in which the alloy composition of the 2nd underlayer of the media as described above was changed to Cr-30 at. %V (#9), changed to Cr-15 at. %Ta (#10), or changed to Cr-15 at. %Nb (#11), were prepared.

Magnetic recording media prepared are evaluated by electron beam diffraction method and x-ray diffraction method with a transmission electron microscope, and it is confirmed that both the 1st underlayer and the 2nd underlayer have b c c structure and that their {100} surface are oriented along nearly parallel direction to the substrate surface. Table 2 shows such characteristics of the magnetic recording media made in this embodiment as coercivity (in-plane coercivity) measured under magnetic field given along parallel direction to the film surface (circumference direction of a disk), average crystal grain diameter evaluated with a transmission electron microscope, and SLF/Nd evaluated by similar way as in the embodiment 1. As shown in this Table, high coercivity of over 250 kA/m is obtained in the magnetic recording media (#7,#8) in which CrMo or CrW is used as the 2nd underlayer. This is based on that c axis of the magnetic layer is parallel to the film surface. The magnetic layers in these media have relatively small average crystal grain diameter of about 11~12 nm, accordingly the medium noise is decreased and high SLF/Nd ratio of over 29 dB is obtained.

In comparison with this, the medium (#9) in which CrV layer is formed as the 2nd underlayer, has low coercivity of 175 kA/m and low SLF/Nd ratio of 26.9 dB. Additionally, the media in which CrTa layer is formed as the 2nd underlayer (#10), and CrNb layer is formed as the 2nd underlayer (#11), have lower coercivity of 50 kA/m and low SLF/Nd ratio of 18 dB or less. It is confirmed from x-ray diffraction spectrum that c axis of the magnetic layers of these media are turned to vertical direction to the film surface, consequently the coercivity measured under magnetic field given along parallel direction to film surface become lower.

The average crystal grain diameter of the media #7 and #8 in this embodiment in which the alloy added with B is used for the magnetic layer, are relatively smaller than those of the media #1 and #2 in which the Cr alloy layers of same group are used for the 2nd underlayers. Accordingly the medium noise is decreased and high SLF/Nd ratio is obtained. It is not that all Cr alloy may be used for the 2nd underlayer formed on CrTi. As described above, by using CrMo or CrW alloy as the 2nd underlayer, c axis of the magnetic layer can be oriented along parallel direction to the film surface, hereby, high in-plane coercivity required for high density recording can be obtained. As above, by means that the Co alloy magnetic layer to which Pt, Cr, and B are added simultaneously, is formed on the underlayer of the double layer which comprises CrTi and CrMo or CrTi and CrW, the magnetic layer having small crystal grain diameter and high in-plane coercivity can be formed, and the in-plane magnetic recording medium having high signal to noise ratio can be obtained.

Magnetic recording systems as described in the embodiment 3 using the medium #7 or #8 in this embodiment were constituted, and consequently the recording density of over 10 Gbits/in$^2$ could be achieved respectively.

Embodiment 5

The magnetic recording media in which the magnetic layer of Co-20 at. %Cr-8 at. %Pt-3 at. %Ta alloy with thickness of 21 nm in embodiment 1 was replaced by Co-22 at. %Cr-14 at. %Pt-4 at. %B alloy magnetic layer with thickness of 19 nm, thickness of the 1st underlayer was changed to 20 nm, the alloy composition of the 2nd underlayer was changed to Cr-20 at. %W, and thickness of the 2nd underlayer was varied from 0.5 nm to 27 nm, were prepared.

Figure 6:
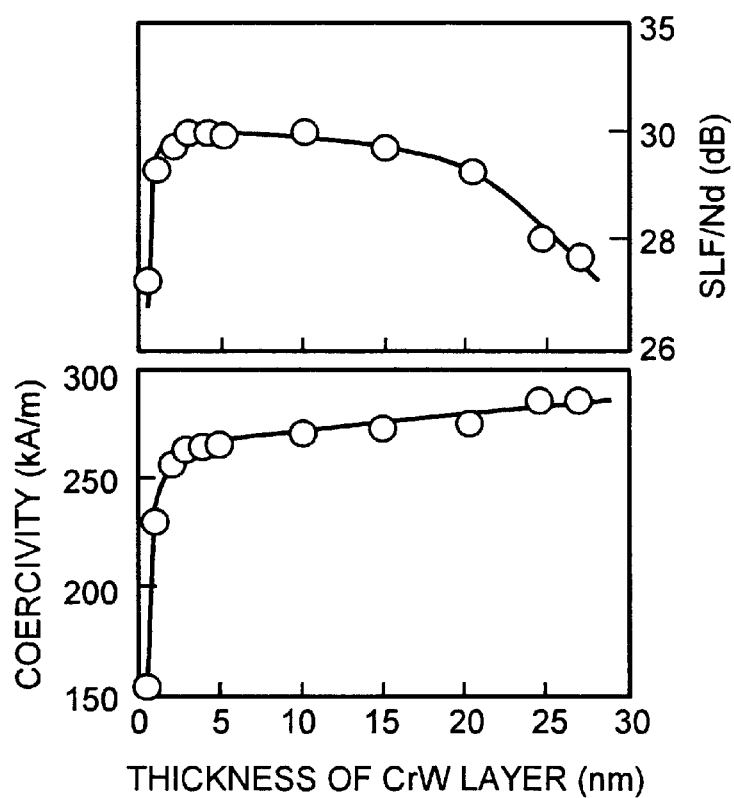
FIG. 6 is graphs showing relation of coercive force to CrW layer thickness and relation of SLF/Nd, a ratio of isolated reproduced signal to integrated medium noise, to CrW layer thickness in a magnetic recording medium of an embodiment of the present invention.

Magnetic recording media prepared were evaluated by electron beam diffraction method and x-ray diffraction method with a transmission electron microscope, and it was verified that the 1st underlayer has b c c structure and its {100} surface was oriented along nearly parallel direction to the substrate surface. Relation of the in-plane coercivity of the magnetic recording media prepared in this embodiment to the thickness of the 2nd underlayer, and relation of the SLF/Nd ratio evaluated by similar way as in the embodiment 1 to the thickness of the 2nd underlayer, are shown in FIG. 6. If the thickness of the CrW layer as the 2nd underlayer is thinner than 1 nm, the coercivity is decreased drastically and SLF/Nd is decreased also. When the thickness of the CrW layer is 5 nm or thicker, the coercivity is increased gradually with increase of the thickness of the CrW layer. Further, SLF/Nd is decreased drastically again when the thickness of the CrW layer is thicker than 20 nm which is the same as the thickness of the CrTi layer of the 1st underlayer. From this result, it is desirable that the thickness of the 2nd underlayer is thinner than that of the 1st underlayer and is 1 nm or more and 20 nm or less.

Comparative Example 1

The magnetic recording media (#12~#16) in which the 1st underlayer of Cr-20 at. %Ti alloy in the medium #7 of embodiment 4, was changed to of Cr, Cr-30 at. %V, Cr-15 at. %Ta, Cr-20 at. %W, or Cr-15 at. %Nb (#16), were prepared. Table 3 shows such characteristics of the magnetic recording media made in this comparative example as in-plane coercivity, and SLF/Nd evaluated by similar way as in the embodiment 1. SLF/Nd of the all media are lower than that of the medium #7 in Table 2. In the medium #12 and #13, c axes of the magnetic layer are oriented along nearly parallel direction to the substrate surface, and high coercivity are obtained. But their crystal grain diameter are larger than that of the medium #7, accordingly medium noise are increased and SLF/Nd are decreased. In the medium #14~16, the crystal grain diameter becomes relatively large and simultaneously number of crystal grains in the magnetic layer of which c axes are turned to vertical direction to the film surface are increased, accordingly the medium noise is increased and SLF/Nd is decreased. In comparison with these media in this comparative example, the medium #7 and #8 have superior characteristics.

Embodiment 6

The magnetic recording media in which the magnetic layer of Co-20 at. %Cr-8 at. %Pt-3 at. %Ta alloy with thickness of 21 nm in embodiment 1 was replaced by Co-21 at. %Cr-14 at. %Pt-1 at. %Ta-4 at. %B alloy magnetic layer with thickness of 19 nm, thickness of the 1st underlayer was changed to 20 nm, and the 2nd underlayer was replaced by Cr-17 at. %W with thickness of 5 nm (#17) or replaced by Cr-17 at. %Mo with thickness of 5 nm (#18), were prepared. Table 4 shows such characteristics of the magnetic recording media made in this embodiment as in-plane coercivity, and SLF/Nd evaluated by similar way as in the embodiment 1. Additionally, resolution Re is also shown in this Table, which is a percentage ratio of reproduced signal output at 300 kFCI to isolated reproduced signal output. Either medium had high in-plane coercivity of over 250 kA/m and high SLF/Nd of over 29 dB, and high recording density of over 10 Gbits/in² could be achieved.

In comparison of two media, the medium #17 using CrW alloy as the 2nd underlayer has lower medium noise and accordingly higher SLF/Nd. In contrast, the medium #18 using CrMo alloy as the 2nd underlayer is characterized that it has relatively higher resolution. Accordingly, the medium using CrW alloy as the 2nd underlayer is suitable for a magnetic recording system built in a portable host system as notebook type personal computer, in which transfer rate is relatively low and medium noise is dominant. In contrast, the medium using CrMo alloy as the 2nd underlayer is suitable for a magnetic recording system having high transfer rate, in which ratio of medium noise to total system noise is comparatively low and relatively high output voltage is required at high recording density region.

Embodiment 7

Figure 7:
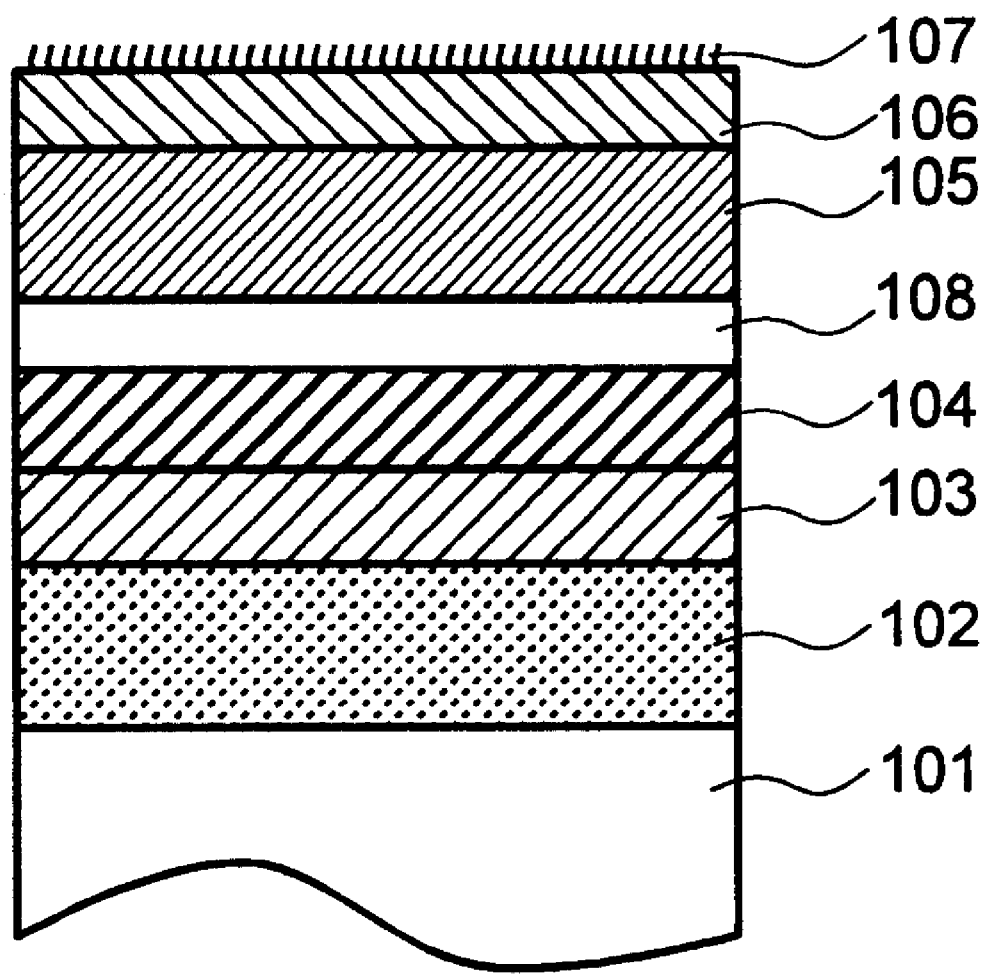
FIG. 7 is a cross sectional view showing a structure of a magnetic recording medium of an embodiment of the present invention or a magnetic recording medium obtained by its producing method.

The magnetic recording media as described in embodiment 6, except that thickness of the magnetic layer was changed to 15 nm and that additionally an intermediate layer 108 was inserted between the magnetic layer and the 2nd underlayer as shown in FIG. 7, was prepared. Here, as the intermediate layer, Co-22 at. % Cr-12 at. % Pt alloy layer with thickness of 3 nm was formed.

In-plane coercivity of the magnetic recording medium prepared was 273 kA/m and was higher than that of the medium made in the embodiment 6. This is based on that, by inserting the intermediate layer, c axes of the crystal grains constituting the magnetic layer are orientated more uniformly to in-plane direction. SLF/Nd of 29.5 dB was obtained and it was nearly equal to that of the medium made in the embodiment 6. The coercivity of this medium is high and higher recording bit density can be formed by using this medium. Consequently, in the magnetic recording system as constituted in the embodiment 3, high recording density of 13 Gbits/in² could be achieved.

In the present embodiment, CoCrPt alloy was used for the intermediate layer, but other elements as Ni, Ti, Ta, B, etc. may be also added if necessary within the limited amount. It is desirable that the sum of the content of the other element is about 5 at. % or less. Further, when Ta or B is added, it is desirable that the content of the element contained in the intermediate layer is lower than content of the same element contained in the magnetic layer. Hereby, in-plane orientation ratio of c axes of the crystal grains constituting the magnetic layer can be made higher than that without the intermediate layer. It is desirable that the thickness of the intermediate layer is 1 nm or more and equal to the thickness of the magnetic layer or less. When thickness of the intermediate layer is thinner than 1 nm, the effect to increase in-plane orientation ratio of c axes of the crystal grains constituting the magnetic layer is nearly eliminated. When thickness of the intermediate layer is thicker than the thickness of the magnetic layer, the effect to decrease the medium noise which is obtained by adding Ta or B to the magnetic layer is deteriorated.

As described above, by using the magnetic recording medium, the producing method of the medium, and the magnetic recording system of the embodiments, in the magnetic recording medium having Co alloy magnetic layer containing Pt by which relatively high coercivity is obtained, the crystal grain diameter can be decreased and c axis being equal to easy axis of magnetization can be oriented to in-plane direction, accordingly, high output voltage and low medium noise are obtained, hereby, a small size magnetic recording system having large storage capacity and high reliability can be achieved.

While the invention has been concretely described with reference to preferred embodiments, it is to be understood that the invention is not limited to the embodiments and that various changes and modifications could be effected therein by one skilled in the art without departing from the spirit or scope of the invention.

By the magnetic recording medium of the present invention, an effect that high signal to noise ratio at high recording density region can be achieved, is obtained.

By the producing method of the magnetic recording medium of the present invention, an effect that the magnetic recording medium by which high signal to noise ratio is achieved at high recording density region can be produced with high reproductivity, is obtained.

By the magnetic recording system of the present invention, an effect that small size large capacity magnetic recording system having high magnetic recording density of over 5 Gbits/in² can be provided, is obtained.

TABLE 1

| MEDIUM NO. | 1ST UNDER LAYER | 2ND UNDER LAYER | COERCIVITY (kA/m) | CRYSTAL GRAIN DIAMETER (nm) | SLF/Nd (dB) |
| --- | --- | --- | --- | --- | --- |
| #1 | Cr-20at. % Ti | Cr-30at. % Mo | 208 | 13.2 | 28.3 |
| #2 | Cr-20at. % Ti | Cr-30at. % W | 205 | 13.1 | 28.2 |
| #3 | Cr-20at. % Ti | Cr | 143 | 13.3 | 25.6 |
| #4 | Cr-20at. % Ti | Cr-30at. % V. | 168 | 14.6 | 26.7 |
| #5 | Cr-20at. % Ti | — | 82 | 12.7 | 22.3 |
| #6 | Cr-20at. % Mo | — | 194 | 23.5 | 23.1 |

TABLE 2

| MEDIUM NO. | 1ST UNDER LAYER | 2ND UNDER LAYER | COERCIVITY (kA/m) | CRYSTAL GRAIN DIAMETER (nm) | SLF/Nd (dB) |
| --- | --- | --- | --- | --- | --- |
| #7 | Cr-20at. % Ti | Cr-20at. % Mo | 258 | 11.6 | 29.1 |
| #8 | Cr-20at. % Ti | Cr-20at. % W | 251 | 11.3 | 29.8 |
| #9 | Cr-20at. % Ti | Cr-30at. % V | 175 | 14.2 | 26.9 |
| #10 | Cr-20at. % Ti | Cr-15at. % Ta | 46 | 14.4 | 17.8 |
| #11 | Cr-20at. % Ti | Cr-15at. % Nb | 41 | 14.5 | 17.3 |

TABLE 3

| MEDIUM NO. | 1ST UNDER LAYER | 2ND UNDER LAYER | COERCIVITY (kA/m) | SLF/Nd (dB) |
|---|---|---|---|---|
| #12 | Cr | Cr-20at. % Mo | 272 | 23.9 |
| #13 | Cr-30at. % V | Cr-20at. % Mo | 275 | 22.3 |
| #14 | Cr-15at. % Ta | Cr-20at. % Mo | 185 | 14.3 |
| #15 | Cr-20at. % W | Cr-20at. % Mo | 205 | 16.5 |
| #16 | Cr-15at. % Nb | Cr-20at. % Mo | 224 | 18.2 |

What is claimed is:

1. A magnetic recording medium having a Co-based alloy magnetic layer possessing a c-axis oriented in-plane, containing Pt and at least one element selected from a group consisting of Ta and B formed on a substrate through an underlayer, characterized in that said underlayer comprises a double layered structure which is formed by stacking a $1^{st}$ underlayer of Cr-based alloy containing Ti, and a $2^{nd}$ underlayer of Cr-based alloy containing at least one element selected from a group consisting of Mo and W, in this sequence, wherein the Cr content in said $1^{st}$ underlayer is 80 at. % and the Ti content in said $1^{st}$ underlayer is 20 at. %, and the Mo content and the W content in said $2^{nd}$ underlayer is in the range of 18–20 at. %.

2. The magnetic recording medium as claimed in claim 1, wherein said $1^{st}$ underlayer has a body-centered cubic structure.

3. The magnetic recording medium as claimed in claim 1, wherein a fine crystalline metal layer or a substantially amorphous metal layer of which main component is Co or Ni, is formed between said substrate and said $1^{st}$ underlayer.

4. The magnetic recording medium as claimed in claim 1, wherein an intermediate layer comprising an alloy of which the main components are Co, Cr, and Pt, is formed between said $2^{nd}$ underlayer and said magnetic layer.

5. The magnetic recording medium as claimed in claim 1, wherein said magnetic layer comprises a Co-based alloy containing at least Cr, Pt, and Ta.

6. The magnetic recording medium as claimed in claim 5, wherein the Pt content in said magnetic layer is in the range of 3–25 at. % and the Ta content is in the range of 1–5 at. %.

7. The magnetic recording medium as claimed in claim 1, wherein said magnetic layer comprises a Co-based alloy containing at least Cr, Pt, and B.

8. The magnetic recording medium as claimed in claim 7, wherein the Pt content in said magnetic layer is in the range of 3–25 at. % and the B content is in the range of 1–15 at. %.

9. A method of producing a magnetic recording medium characterized in that the producing process includes a process to heat a substrate previous to forming $1^{st}$ underlayer on the substrate, and a process to form a $1^{st}$ underlayer, a $2^{nd}$ underlayer, and a magnetic layer possessing a c-axis oriented in-plane containing Pt and at least one element selected from a group consisting of Ta and B in this sequence in vacuum chambers by sequential sputtering method after heating the substrate, and that a target which comprises Cr-based alloy containing Ti is used to form said $1^{st}$ underlayer, and a target which comprises Cr-based alloy containing at least one element selected from a group comprising Mo and W is used to form said $2^{nd}$ underlayer, wherein the Cr content in said $1^{st}$ underlayer is 80 at. % and the Ti content in said $1^{st}$ underlayer is 20 at. %, and the Mo content and the W content in said $2^{nd}$ underlayer is in the range of 18–20 at. %.

10. A method of producing a magnetic recording medium as claimed in claim 9, wherein said $1^{st}$ underlayer has a body-centered cubic structure.

11. A method of producing a magnetic recording medium as claimed in claim 9, wherein a fine crystalline metal layer or a substantially amorphous metal layer of which main component is Co or Ni, is formed between said substrate and said $1^{st}$ underlayer.

12. A method of producing a magnetic recording medium as claimed in claim 9, wherein an intermediate layer comprising an alloy of which the main components are Co, Cr, and Pt, is formed between said $2^{nd}$ underlayer and said magnetic layer.

13. A method of producing a magnetic recording medium as claimed in claim 9, wherein said magnetic layer comprises a Co-based alloy containing at least Cr, Pt, and Ta.

14. A method of producing a magnetic recording medium as claimed in claim 13, wherein the Pt content in said magnetic layer is in the range of 3–25 at. % and the Ta content is in the range of 1–5 at. %.

15. A method of producing a magnetic recording medium as claimed in claim 9, wherein said magnetic layer comprises a Co-based alloy containing at least Cr, Pt, and B.

16. A method of producing a magnetic recording medium as claimed in claim 15, wherein the Pt content in said magnetic layer is in the range of 3–25 at. % and the Ta content is in the range of 1–5 at. %.

17. A magnetic recording system comprising a magnetic recording medium, a driving mechanism which drives said magnetic recording medium, a magnetic head which comprises a recording part and a reproducing part, an actuator which moves said magnetic head relatively to said magnetic recording medium, and a read and write signal processing means which sends recording signal to said head and processes reproduced signal from said head, which characterized in that a reproducing part of said magnetic head comprises a magnetoresistive sensor which includes plural conductive magnetic layers in which large resistance variation is occurred when mutual magnetization direction changes relatively by external magnetic field, and magnetoresistive sensor including conductive non-magnetic layers formed between said conductive magnetic layers, and said magnetic recording medium comprises the magnetic recording medium as claimed in claim 1.

* * * * *